July 18, 1939.  R. S. HINSEY  2,166,356
GRINDING MACHINE
Filed March 23, 1936  2 Sheets-Sheet 1

Inventor
ROBERT S. HINSEY.
Frank Fraser
Attorney

July 18, 1939.　　　　　R. S. HINSEY　　　　　2,166,356
GRINDING MACHINE
Filed March 23, 1936　　　　2 Sheets-Sheet 2

Inventor
ROBERT S. HINSEY.
Frank Fraser
Attorney

Patented July 18, 1939

2,166,356

UNITED STATES PATENT OFFICE 2,166,356

GRINDING MACHINE

Robert S. Hinsey, Toledo, Ohio, assignor to Libbey-Owens-Ford Glass Company, Toledo, Ohio, a corporation of Ohio Application March 23, 1936, Serial No. 70,237

13 Claims. (Cl. 51—80)

This invention relates to grinding machines generally and more particularly to a machine which is of especial utility in the notching of glass sheets or plates to facilitate the supporting thereof during tempering.

In the present practice of tempering glass sheets, the said sheets are first heated to approximately the point of softening of the glass and then quickly cooled by directing blasts of air against opposite surfaces thereof simultaneously. When tempering glass sheets in this manner, the sheet must be supported so that it is free to expand and contract in its own plane and to this end it is customary to suspend the sheet from a plurality of relatively small tongs or hooks which engage opposite faces of the said sheet near its upper edge. The sheet is also usually provided with small nicks or notches which are engageable by the said hooks or tongs, the weight imposed by the glass tending to close the tongs and thus give the necessary gripping action upon the sheet.

It is the aim of this invention to provide a machine of relatively simple, compact construction for forming the notches or nicks in the glass sheets or plates in a rapid, convenient and economical manner.

Among the objects of the invention are to provide a machine of this character which will operate to notch both faces of the sheet simultaneously and wherein the notches will be disposed directly opposite one another; to provide a machine wherein a uniform grinding pressure will be maintained upon the glass at all times; and further to provide a machine wherein the notches formed thereby will be of a uniform predetermined depth.

Other objects and advantages of the invention will become more apparent during the course of the following description when taken in connection with the accompanying drawings.

In the drawings wherein like numerals are employed to designate like parts throughout the same, Fig. 1 is a side elevation of a grinding machine constructed in accordance with the present invention;

Fig. 5 is a view showing the manner in which a glass sheet is supported during tempering; and Fig. 6 is a front view of a glass sheet showing the notches formed therein by the grinding machine.

Figure 1:
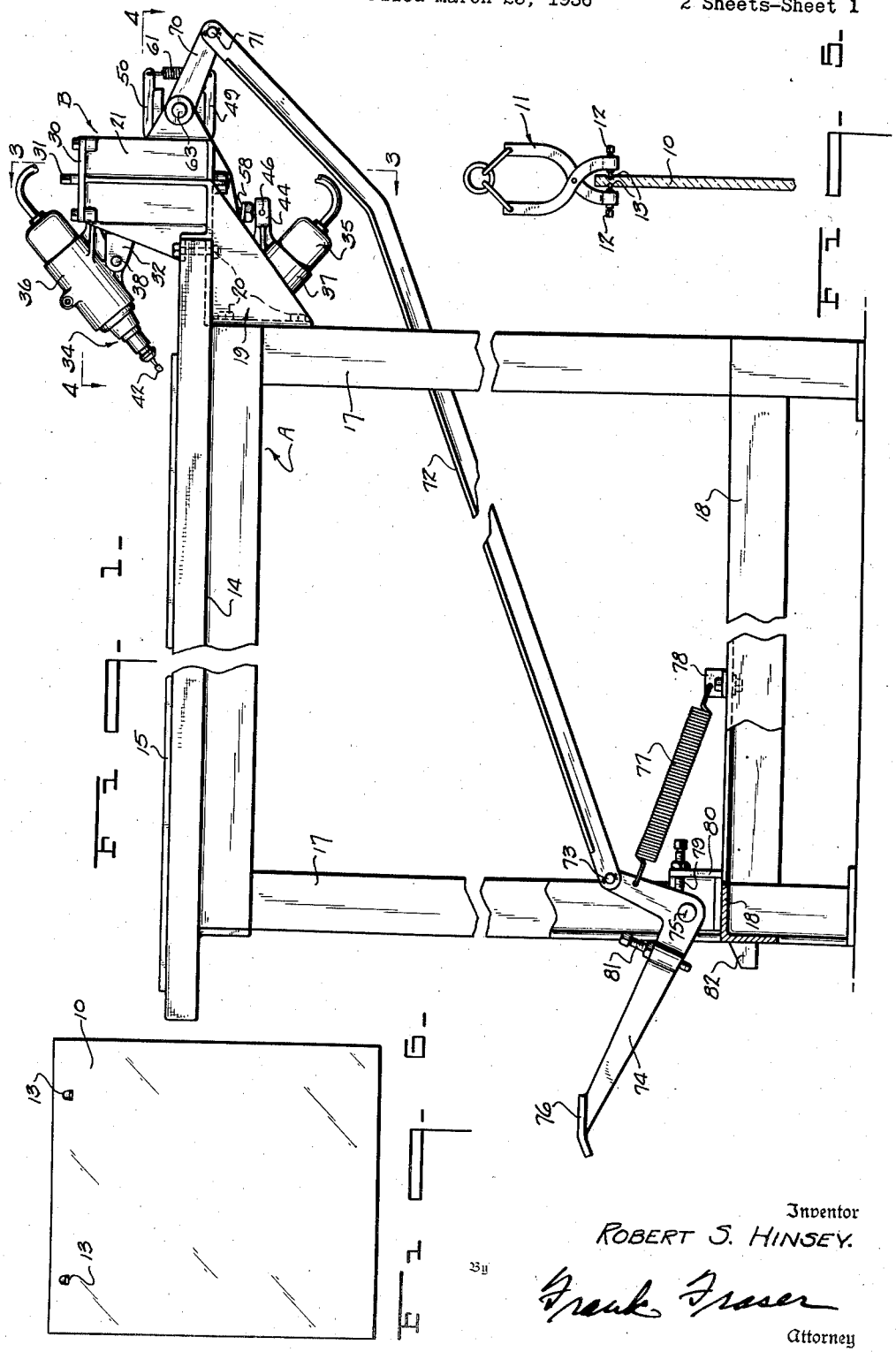

Referring now to the drawings, there is illustrated in Fig. 5 a sheet or plate of glass 10 to be tempered suspended in a vertical position from a plurality of relatively small hooks or tongs 11 which are provided with the usual horizontal pins 12 engaging opposite faces of the glass sheet near its upper edge. In order to facilitate the supporting of the sheet during tempering, it is customary to provide relatively small nicks or notches 13 in the opposite faces of the glass sheet and which are engaged by the pins 12 of the tongs. As shown in Fig. 6, the notches 13 are preferably positioned relatively closely adjacent the upper edge of the glass sheet and also preferably adjacent the opposite ends thereof. The machine of this invention, while primarily designed for forming the notches 13 in the glass sheets, is of course not restricted to such use.

With reference particularly to Figs. 1 to 4, the machine comprises generally a table A for supporting the glass sheet to be notched, and the grinding mechanism B for doing the notching, the grinding mechanism being preferably mounted upon the table at one end thereof and adapted to notch the glass sheet while supported upon the latter. The table A includes a horizontal top 14 upon which the glass sheet 15 is horizontally laid, the upper surface of the table top being preferably covered with a pad 16 of felt or the like to protect the glass. The top of the table is supported by a suitable framework including the vertical legs 17 which may be connected together adjacent their lower ends by the horizontal angle beams 18.

The grinding mechanism B is preferably, though not necessarily, mounted upon the table A. Thus, there may be carried by the table, at one end thereof, a bracket member 19 secured thereto by bolts or the like 20 and comprising a substantially vertically disposed plate portion 21 having spaced vertical channels or guideways 22. Carried by the bracket member 19 is a supporting member 23 which is provided at one side thereof with spaced vertical flanges 24 formed with tongues 25 which are slidably received within the guideways 22 in bracket member 19.

The supporting member 23 is also provided between the flanges 24 and intermediate its upper and lower ends with a boss 26 through which is threaded a vertical screw 27, said screw being provided for rotatable movement but held against longitudinal movement. To this end the screw 27 is journaled at its lower end in a bearing 28 carried by the bracket member 19, while the upper end thereof is reduced in diameter as at 29 and passed loosely through a horizontal plate 30 carried at the upper end of said bracket member 19, the upper projecting end of the said screw being formed with a wrench head or the like 31. Upon turning of the screw 27, the supporting member 23 can be moved upwardly or downwardly as desired relative to the bracket member 19.

The supporting member 23 is provided at its upper and lower ends with the inwardly directed pairs of spaced ears 32—32 and 33—33 to which are pivotally mounted the grinding units 34 and 35 respectively. The grinding units 34 and 35 are carried within sleeves 36 and 37 which are pivotally mounted upon horizontal pins 38 and 39 passing through the ears 32—32 and 33—33. Each grinding unit 34 and 35 comprises a motor 40 suitably connected with a desired source of power and driving a shaft 41 upon which is mounted the grinding element 42 which preferably consists of a cylindrical grinding wheel similar to a dental or die maker's grinding point.

The sleeves 36 and 37 are provided with the outwardly projecting, substantially horizontal arms 43 and 44 to which are pivoted as at 45 and 46 the vertically aligned pins 47 and 48 respectively, the pin 47 depending from arm 43 while the pin 48 projects upwardly from arm 44. The pins 47 and 48 are received within openings 43' and 44' in the arms 43 and 44 respectively, the said openings being sufficiently large to permit the desired pivoting of the grinding units.

Figures 3, 4:
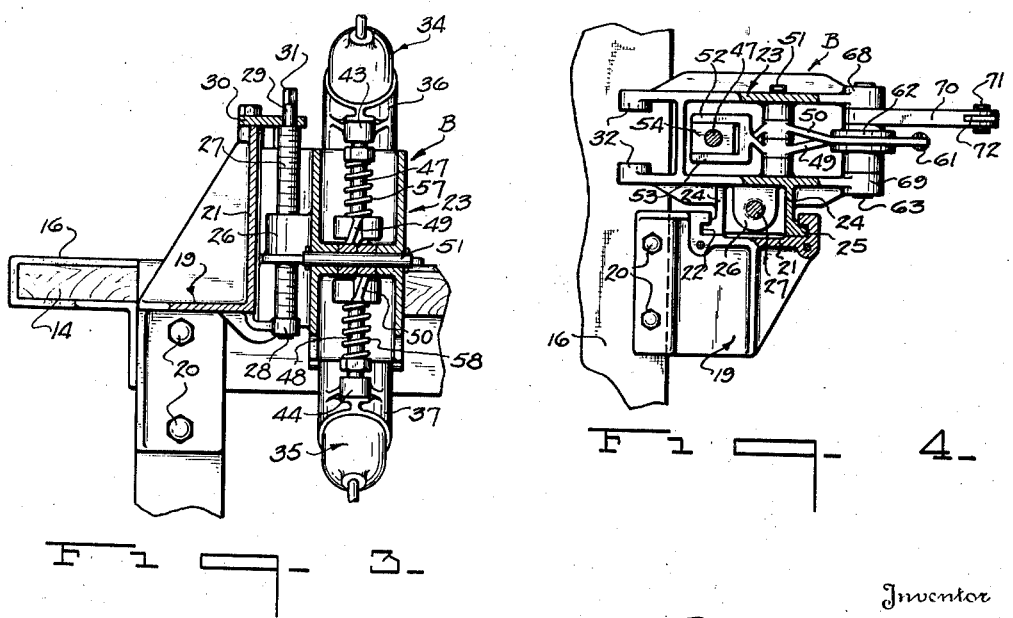
Fig. 3 is a vertical sectional view taken substantially on line 3—3 of Fig. 1.
Fig. 4 is a horizontal sectional view taken substantially on line 4—4 of Fig. 1, with the upper grinding unit removed.

The numerals 49 and 50 designate two complemental operating levers pivotally connected in overlapping relation intermediate their ends upon a horizontal pin 51 carried by the supporting member 23. The levers 49 and 50 are bent as at a $a$ and cross one another at substantially right angles so that the opposite ends thereof may be swung simultaneously toward and away from one another. The inner ends $b$ of the levers are bifurcated, as best shown in Fig. 4, to provide the spaced parallel legs 52 and 53, and arranged between the legs of the levers 49 and 50 are blocks 54 and 55 respectively secured to the said levers by screws or the like 56. The blocks 54 and 55 are provided with openings through which the inner adjacent ends of the pins 47 and 48 are loosely received, the said pins being provided at their inner ends with heads 47' and 48'. Encircling the pins 47 and 48 are compression springs 57 and 58 respectively, the opposite ends of which bear against the blocks 54 and 55 and nuts 59 and 60 threaded upon the said pins 47 and 48 respectively. The outer ends $c$ of the levers 49 and 50 are connected together by a tension spring 61.

Positioned between the outer ends of the levers 49 and 50 is a rotatable cam 62 mounted upon a transverse shaft 63 and provided with oppositely disposed lobes 64 and 65 adapted to engage the wear strips 66 and 67 on the levers 49 and 50 respectively. The shaft 63 is journaled at its opposite ends in bearings 68 and 69 formed on the supporting member 23 (Fig. 4).

Figure 2:
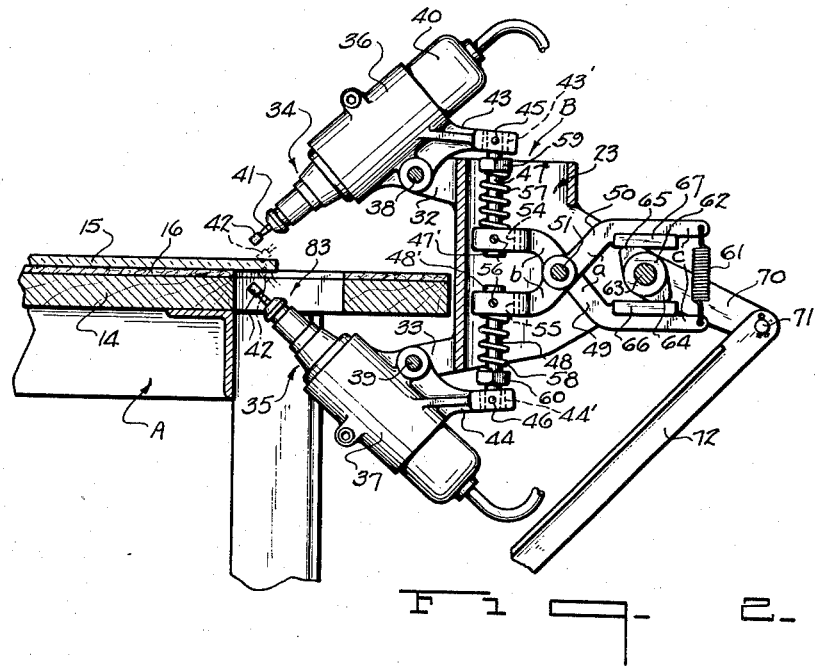
Fig. 2 is a vertical sectional view therethrough.

With reference to Fig. 2, the grinding elements 42 of the grinding units 34 and 35 are shown in full lines in inoperative position and are maintained in such position by the tension spring 61 which acts to force the inner ends $b$ of the levers 49 and 50 inwardly toward one another whereupon the blocks 54 and 55 carried by the said levers, engaging the heads 47' and 48' at the inner ends of vertical pins 47 and 48 respectively, will draw the said pins inwardly with the result that the sleeves 36 and 37 will be swung outwardly about their pivots 38 and 39 to move the grinding elements 42 away from one another and into inoperative position. When it is desired to move the grinding elements into operative position, the cam 62 is rotated in a clockwise direction, whereupon the lobes 64 and 65 on the cam, engaging wear strips 66 and 67 on levers 49 and 50 will force the outer ends $c$ of the said levers away from one another. Simultaneously, the inner ends $b$ of the levers will also be forced apart whereupon the blocks 54 and 55 carried thereby will move along the pins 47 and 48 respectively to compress the springs 57 and 58. When the springs have been compressed to a predetermined point, the compression thereof will act to swing the sleeves 36 and 37 respectively in a counter-clockwise and clockwise direction about their pivots 38 and 39, thereby moving the grinding elements 42 toward one another and into grinding engagement with the glass sheet 15 as indicated by the broken lines in Fig. 2.

The movement of the grinding elements 42 into engagement with the sheet is adapted to be manually effected by an operator, and to this end there is keyed to the transverse shaft 63 a bar 70 to the outer end of which is pivoted, as at 71, a connecting bar 72 pivoted at its opposite end as at 73 to one end of a substantially L-shaped operating lever or pedal 74. The lever 74 is pivoted intermediate its ends as at 75 and is provided at its forward end with a foot engageable surface 76. The lever 74 is normally urged in a clockwise direction by a tension spring 77 connected at one end to the lever adjacent the pivot point 73 and at its opposite end to an angle plate 78 carried by the supporting framework of the table A. The movement of the lever in this direction, which is limited by a horizontal set screw 79 carried by bracket 80, tends to rotate the shaft 63, through bars 70 and 72, in a counterclockwise direction, thereby moving the cam 62 to the position shown in Fig. 2.

After the glass sheet 15 to be notched has been properly positioned upon the table, the operator presses downwardly upon the outer end of lever 74, causing the opposite end thereof to be swung forwardly against the action of the tension spring 77, thereby also drawing the connecting bar 72 forwardly to effect the rocking of the shaft 63 in a clockwise direction whereupon the lobes 64 and 65 on cam 62 will force the outer ends of the levers 49 and 50 apart to move the grinding elements into operative position as explained above. The downward movement of the outer end of lever 74 is limited by a set screw 81 carried by the said lever and engaging a stop 82.

In practice, the sheet 15 is of course placed upon the table so that one edge portion thereof is disposed between the grinding elements 42. The top 14 of the table is provided with an opening 83, as shown in Fig. 2, through which the lower grinding element operates.

In the operation of the machine as explained above, it will be seen that the grinding elements 42 are spring pressed against the glass sheet during the notching thereof. Also, that while the operator, upon depressing the lever 74, causes the inner ends of the levers 49 and 50 to be moved apart to compress the springs 57 and 58, the said springs actually function to swing the grinding elements into engagement with the sheet and to maintain them in such position. In other words, the operator simply presses downwardly upon lever 74 until the set screw 81 engages stop 82 at which time the compression of the springs 57 and 58 is such as to move the grinding elements into operative position and to maintain them in yieldable engagement with the sheet until downward pressure upon the lever 74 is released. When this is done, the tension spring 77 will act to cause rotation of the shaft 63 in a counter-clockwise direction to return the cam 62 to the position shown in Fig. 2, whereupon the spring 61 will draw the inner ends of the levers 49 and 50 inwardly so as to swing the grinding elements into inoperative position.

From the above, it will be apparent that the pressure of the grinding elements upon the sheet is not controlled by the operator but by the pressure of the springs 57 and 58. Consequently, the action of the springs will serve to maintain the pressure of the grinding elements upon the sheet constant at all times.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a grinding machine of the character described for notching glass sheets or the like, a support for the sheet, grinding mechanism mounted adjacent the support and including a pair of grinding elements arranged at an acute angle relative to the sheet and having their working faces positioned to engage opposite surfaces thereof at opposed points to notch the same, means for pivotally mounting the grinding elements, means for moving said grinding elements into and out of engagement with said sheet, and spring means for yieldably maintaining the said grinding elements in engagement with the said sheet.

2. In a grinding machine of the character described for notching glass sheets or the like, a support for the sheet, grinding mechanism mounted adjacent the support and comprising a pair of grinding units including driven grinding elements rotatable about axes extending diagonally relative to the sheet and having their working faces positioned to engage opposite surfaces of the sheet at opposed points to notch the same, pivotally mounted means for supporting each grinding unit, and means for swinging said supporting means simultaneously in opposite directions to move the grinding elements into and out of engagement with the sheet.

3. In a grinding machine of the character described for notching glass sheets or the like, a support for the sheet, grinding mechanism mounted adjacent the support and comprising a pair of grinding units including driven grinding elements rotatable about axes extending diagonally relative to the sheet and having their working faces positioned to engage opposite surfaces of the sheet at opposite points to notch the same, pivotally mounted means for supporting each grinding unit, means for swinging said supporting means simultaneously in opposite directions to move the grinding elements into and out of engagement with the sheet, and spring means for maintaining the pressure of the said grinding elements upon the sheet substantially constant.

4. In a grinding machine of the character described for notching glass sheets or the like, a support for the sheet, grinding mechanism mounted adjacent the support and comprising a pair of grinding units including driven grinding elements rotatable about axes extending diagonally relative to the sheet, pivotally mounted means for supporting each grinding unit, means for swinging said supporting means simultaneously in opposite directions to move the grinding elements into and out of engagement with the sheet, spring means for maintaining the pressure of the said grinding elements upon the sheet substantially constant, and means for moving the grinding units bodily vertically in unison relative to the support for the sheet.

5. In a grinding machine of the character described for notching glass sheets or the like, a support for the sheet, grinding mechanism mounted adjacent the support and comprising a pair of grinding units including grinding elements rotatable about axes extending at an acute angle relative to the sheet and having their working faces positioned to engage opposite surfaces thereof at opposed points to notch the same, pivotally mounted means for supporting the grinding units, means for swinging said supporting means to move the grinding elements simultaneously in opposite directions into and out of engagement with the sheet while maintaining them at an acute angle with respect thereto, and means for maintaining the grinding elements in yieldable engagement with the sheet.

6. In a grinding machine of the character described for notching glass sheets or the like, a support for the sheet, grinding mechanism mounted adjacent the support and comprising a pair of grinding units including grinding elements rotatable about axes extending at an acute angle relative to the sheet and adapted to engage opposite faces thereof at opposed points, pivotally mounted means for supporting the grinding units, means for swinging said supporting means to move the grinding elements simultaneously in opposite directions into and out of engagement with the sheet, spring means for maintaining the pressure of the grinding elements upon the sheet substantially constant, and means for moving the grinding units bodily vertically in unison relative to the support for the sheet.

7. In a grinding machine of the character described for notching glass sheets or the like, a support for the sheet, grinding mechanism mounted adjacent the support and comprising a pair of grinding units including grinding elements rotatable about axes extending at an acute angle relative to the sheet and having their working faces positioned to engage opposite surfaces thereof at opposed points to notch the same, pivotally mounted means for supporting the grinding units, means for swinging said supporting means to move the grinding elements simultaneously in opposite directions into and out of engagement with the sheet embodying a pair of operating levers, operative connections between the levers and the supporting means for the grinding units, and means under the control of an operator for actuating said levers.

8. In a grinding machine of the character described for notching glass sheets or the like, a support for the sheet, grinding mechanism mounted adjacent the support and comprising a pair of grinding units including driven grinding elements, pivotally mounted means for supporting the grinding units, means for swinging said supporting means in opposite directions embodying a pair of operating levers, means for actuating said levers, and spring means disposed between said levers and the pivotally mounted supporting means for the grinding units for effecting the rocking of said unit supporting means upon actuation of the said levers to move the grinding units into engagement with the sheet.

9. In a grinding machine of the character described for notching glass sheets or the like, a support for the sheet, grinding mechanism mounted adjacent the support and comprising a pair of grinding units including driven grinding elements, pivotally mounted means for supporting the grinding units, means for swinging said supporting means in opposite directions embodying a pair of operating levers, means for actuating said levers, and compression springs disposed between said levers and the pivotally mounted supporting means for the grinding units for effecting the rocking of said unit supporting means upon actuation of the said levers to move the grinding units into engagement with the sheet.

10. In a grinding machine of the character described for notching glass sheets or the like, a support for the sheet, grinding mechanism mounted adjacent the support and comprising a pair of grinding units including driven grinding elemets, pivotally mounted means for supporting the grinding units, means for swinging said supporting means in opposite directions embodying a pair of operating levers, means for actuating said levers, pins pivoted to the pivotally mounted means for supporting the grinding units and slidable through said levers, and compression springs encircling said pins for effecting rocking movement of the grinding unit supporting means upon actuation of said levers to move the grinding elements into engagement with the sheet.

11. In a grinding machine of the character described for notching glass sheets or the like, a support for the sheet, grinding mechanism mounted adjacent the support and including a pair of pivotally mounted grinding elements having their working faces arranged to engage opposite surfaces of the sheet at opposed points at an angle other than a right angle relative to said surfaces to notch the same, and means for moving said grinding elements into and out of engagement with said sheet.

12. In a grinding machine of the character described for notching glass sheets or the like, a support for the sheet, grinding mechanism mounted adjacent the support and including a pair of grinding elements having their working faces arranged to engage opposite surfaces of the sheet at opposed points at an acute angle relative to said surfaces to notch the same, and means for moving said grinding elements simultaneously into and out of engagement with said sheet.

13. In a grinding machine of the character described for notching glass sheets or the like, a support for the sheet, grinding mechanism mounted adjacent the support ad including a pair of grinding elements having their working faces arranged to engage opposite surfaces of the sheet at opposed points at an acute angle relative to said surfaces to notch the same, means for pivotally mounting the grinding elements, and means for moving said grinding elements into and out of engagement with said sheet.

ROBERT S. HINSEY.